Patented Oct. 24, 1933

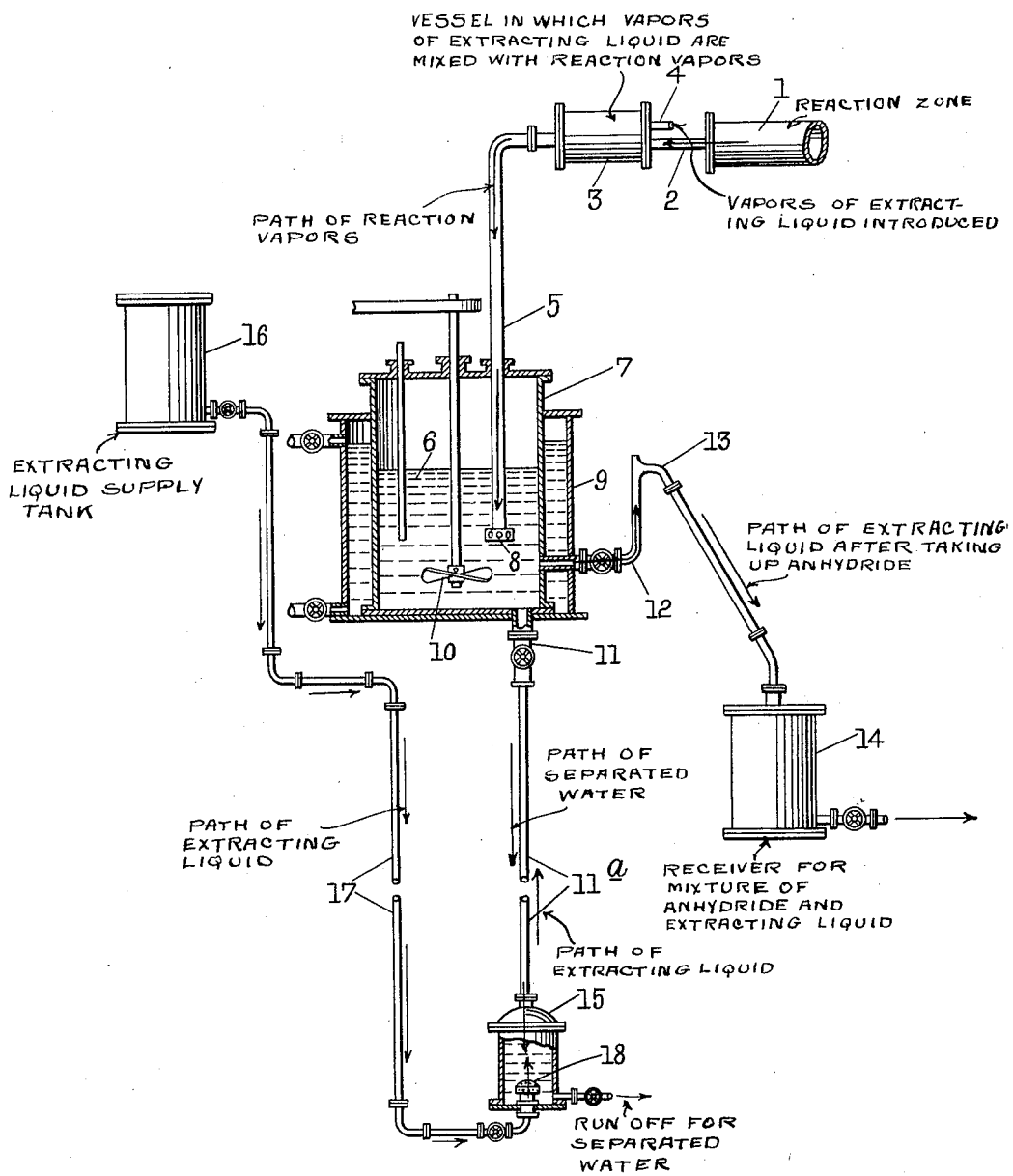

1,931,687

UNITED STATES PATENT OFFICE 1,931,687

MANUFACTURE OF ALIPHATIC ANHYDRIDES

Henry Dreyfus, London, England, and Clifford Ivan Haney, Drummondville, Quebec, Canada, assignors to Celanese Corporation of America, a corporation of Delaware Application June 15, 1928, Serial No. 285,613, and in Great Britain July 14, 1927

20 Claims. (Cl. 260—123)

This invention relates to the manufacture of aliphatic anhydrides from aliphatic acids and especially to the manufacture of acetic anhydride from acetic acid.

It was shown by Peytral (Bulletin de la Société Chimique de France XXXI pages 113-118) that acetic anhydride can be produced by passing glacial acetic acid vapours through platinum tubes heated to high temperatures such as up to 1150° C. In this process a yield of about 2% of acetic anhydride was obtained and the quantity of decomposition products formed such as gases, as given by Peytral, was very small or unsubstantial, most of the vapours from the reaction being recovered as acetic acid on condensation, though statements to the contrary have been given in literature.

We have found that aliphatic acids are split into their anhydrides at relatively high or high temperatures to a very substantial degree or even quantitatively but that if the hot reaction gases or vapours are subjected to simple condensation the anhydride is very largely hydrolyzed back to the aliphatic acid. Thus in the manufacture of aliphatic anhydrides from aliphatic acids by pyrogenic decomposition the important step upon which good yields depend is rather the separation of the anhydride from the reaction gases or vapours and not (as has hitherto been thought the case) the use of particular temperatures or particular catalysts in the pyrogenic decomposition.

The object of the present invention is to provide a process for obviating or eliminating to a large extent this subsequent hydrolysis and loss of anhydride.

According to the present invention we subject the vapours of aliphatic acids (and especially acetic acid) to pyrogenic decomposition in any known or suitable way and subject the gases or vapours from the hot reaction zone to condensation by leading them under the surface of an "extracting" liquid which is cooled down or otherwise kept at temperatures below the boiling point (under the conditions of pressure obtaining) of water.

By the term "extracting" liquid we mean a liquid or liquid mixture in which the anhydride is soluble and which is chemically inert to the anhydride and insoluble or substantially insoluble in water. As examples of such "extracting" liquids may be mentioned, benzene, chloroform, and mixtures of ethyl ether or chloroform with one or more hydrocarbons such as light paraffins, gasoline, kerosene, benzol or its homologues.

We preferably use as the "extracting" liquids, liquids of the character referred to and which are themselves hydrocarbons or which contain hydrocarbons, for example benzene, or mixtures of ethyl ether or chloroform with one or more hydrocarbons such as paraffins (particularly the petroleum fraction of boiling point 40° to 70° C. termed petroleum ether), gasoline (boiling point 70° to 90° C.), kerosene, benzol or its homologues. The following particular examples of "extracting" liquids have been found to be very suitable:— ether in admixture with petroleum ether, chloroform mixed with petroleum and/or gasoline; and mixtures of ether and petroleum ether containing about 30 to 50% of petroleum ether are especially suitable.

In performing the invention the reaction vapours or gases may be condensed below the surface of the "extracting" liquid in any suitable manner, but for the best functioning of the process care should be taken as to the level below the surface of the "extracting" liquid at which the reaction vapours are introduced. Thus in cases where the "extracting" liquid is of lighter gravity than the water, the gases or vapours should preferably be introduced well under the surface of the "extracting" liquid to avoid as far as possible contact between the water and the anhydride. For instance when employing a mixture of ether and petroleum ether as extracting liquid the reaction gases should preferably be introduced well under the surface of the liquid as by this means water condensed can fall to the bottom of the liquid and avoid contact with the incoming vapours thus reducing risk of losses through hydrolysis. In the converse case where the "extracting" liquid is heavier than the water the gases should preferably be introduced near the top of the "extracting" liquid, thus allowing the water to rise and avoid as far as possible contact between the water and the anhydride.

During the condensation the extracting liquid may be kept at any temperature below the boiling point of water. We prefer however to keep the "extracting" liquid at temperatures well below the boiling point of water, for instance, about 15°–25° C. in order to obtain a very quick cooling effect on the incoming reaction gases or vapours. It is also of advantage to subject the "extracting" liquid to gentle stirring to maintain equal temperature throughout the liquid and to ensure as far as possible the contact of fresh "extracting" liquid with the incoming reaction gases or vapours.

Conveniently the extracting liquid containing the anhydride may be run off continuously from the condensation vessel, fresh quantities of the extracting liquid being added to the condensation vessel to enable the process to be carried out continuously. For instance it may be run off continuously by means of a constant level run off in cases where the extracting liquid is lighter than water or from a point on or near the bottom of the condensation vessel in cases where the extracting liquid is heavier than water.

Further, if desired, the water may be run off continuously from the condensation vessel whether or not the extracting liquid is run off continuously. For instance, the water may be run off by means of a constant level run off in cases where the extracting liquid is heavier than water, or from a point on or near the bottom of the condensation vessel in cases where the extracting liquid is lighter than water. When the water is run off continuously from the condensation vessel it is preferably subjected to scrubbing by a counter current of fresh extracting liquid, and conveniently this counter current of extracting liquid may serve as the supply of fresh extracting liquid to the condensation vessel.

If desired the water or the extracting liquid (containing the anhydride) may be run off continuously from the condensation vessel by means of a Florentine bottle such as commonly employed in the essential oil industry and in the manufacture of acetic anhydride.

If desired vapour of the "extracting" liquid may be added to the reaction gases or vapours prior to leading them into contact with the "extracting" liquid.

The accompanying drawing illustrates in diagrammatic form one form of execution of the invention as applied by way of example for the production of acetic anhydride from glacial or concentrated acetic acid, it being understood that this form is given only by way of illustration and in no way as limitative.

In the form shown the reaction gases or vapours are subjected to condensation below the surface of a mixture of ether and petroleum ether, for instance a mixture of equal volumes of ether and petroleum ether.

Referring to the accompanying drawing, the hot reaction gases or vapours produced by the pyrogenic decomposition of the acetic acid pass from the hot reaction zone 1 via the pipe 2 into the vessel 3 in which they are mixed with vapours of the ether/petroleum ether mixture introduced by the pipe 4. The temperature in the vessel 3 is kept well above the boiling points of the constituents, for instance, at about 200°–300° C. The reaction gases or vapours, mixed with the vapours of ether and petroleum ether then pass by the pipe 5 down below the surface of the "extracting" liquid (a mixture of ether and petroleum ether) 6 contained in a brine-cooled or water cooled vessel 7, the end of the pipe 5 carrying a rose or jet 8 to ensure that the gases or vapours are delivered into the "extracting" liquid in a state of fine division. The temperature of the reaction gases or vapours immediately prior to coming in contact with the extracting liquid, is kept at a temperature above the boiling point of water, for instance, about 100°–150° C. The "extracting" liquid is kept at a temperature of about 20° C. by the circulation of cold water or brine through the jacket 9, and gentle stirring is applied to the "extracting" liquid by means of the stirrer 10 to ensure uniformity of temperature in the liquid and to ensure that fresh "extracting" liquid is brought in contact with the incoming gases or vapours. The reaction gases or vapours on issuing from the jet or rose 8 become condensed and the anhydride is separated from the water to a very efficient extent, the anhydride (together with unconverted acetic acid) dissolving in the "extracting" liquid whilst water falls to the bottom of the vessel 7 and runs off through the pipe 11. The vessel 7 is provided with an outlet pipe 12 and a constant level run off 13 and by this means the "extracting" liquid, containing the dissolved anhydride, is run off continuously via the pipe 12, and constant level 13 into the receiver 14.

The water runs off from the vessel 7 through the pipe 11 and pipe 11a to the run off vessel 15, and in so doing is scrubbed by an ascending stream of the extracting liquid fed by gravity from the tank 16 via the pipe 17 to the nozzle 18. The "extracting" liquid issues from the nozzle 18 in the form of a fine spray and passes up through the pipe 11a in the form of small drops and thence via the pipe 11 into the vessel 7; for convenience of observation the pipe 11a is made of glass. By means of this scrubbing very little anhydride or unconverted acid is carried away by the water and the water can be run to waste from the run off vessel 15.

Instead of running the water off from the vessel 7 in the manner above described it may be run off in any other desired manner. For instance it may be run off continuously from the bottom of the vessel 7 by means of a Florentine bottle as commonly employed in the essential oil industry and in the manufacture of acetic anhydride.

The acetic anhydride may readily be recovered from the extracting liquid collected in the receiver 14, for instance the liquid so collected may be heated to distil off the "extracting" liquid.

As before mentioned, in practising the present invention we may subject the aliphatic acid vapour to pyrogenic decomposition in any known or suitable way. The decomposition may if desired be performed in presence of any known catalysts but their use is not necessary.

We prefer to pass the aliphatic acid vapour through copper, fireclay or other tubes (for instance tubes made of material sold under the registered trade mark Vitreosil) heated to high or relatively high temperatures, for instance, 400°–1200° C., and preferably 600°–1000° C.

It will be understood that the invention is not limited as to the strength of acid employed. The process can be performed even with the vapours of dilute acids; and besides affording a ready means for the manufacture of anhydrides from concentrated or highly concentrated acids, it affords valuable means for producing anhydrides from waste or dilute acids, especially waste or dilute acetic acids such as result from the acetylation of cellulose or other industrial acetylation processes.

What we claim and desire to secure by Letters Patent is:—

1. Process for the manufacture of an aliphatic anhydride which comprises subjecting the vapor of an aliphatic acid to pyrogenic decomposition and subjecting the reaction vapors to condensation by leading them under the surface of an extracting liquid the temperature of which is maintained below the boiling point of water.

2. Process for the manufacture of acetic anhydride which comprises subjecting the vapor of acetic acid to pyrogenic decomposition and subjecting the reaction vapors to condensation by leading them under the surface of an extracting liquid the temperature of which is maintained below the boiling point of water.

3. Process for the manufacture of an aliphatic anhydride which comprises subjecting the vapor of an aliphatic acid to pyrogenic decomposition and subjecting the reaction vapors to condensation by leading them under a mixture of ether and petroleum ether, the temperature of said mixture being maintained below the boiling point of water.

4. Process for the manufacture of acetic anhydride which comprises subjecting the vapor of acetic acid to pyrogenic decomposition and subjecting the reaction vapors to condensation by leading them under a mixture of ether and petroleum ether, the temperature of said mixture being maintained below the boiling point of water.

5. Process for the manufacture of an aliphatic anhydride which comprises subjecting the vapor of an aliphatic acid to pyrogenic decomposition and subjecting the reaction vapors to condensation by leading them under the surface of an extracting liquid maintained at a temperature between 15° and 25° C.

6. Process for the manufacture of acetic anhydride which comprises subjecting the vapor of acetic acid to pyrogenic decomposition and subjecting the reaction vapors to condensation by leading them under the surface of an extracting liquid maintained at a temperature between 15° and 25°C.

7. Process for the manufacture of acetic anhydride which comprises subjecting the vapor of acetic acid to pyrogenic decomposition and subjecting the reaction vapors to condensation by leaving them under the surface of a mixture of ether and petroleum ether maintained at a temperature between 15° and 25° C.

8. Process for the manufacture of an aliphatic anhydride which comprises subjecting the vapor of an aliphatic acid to pyrogenic decomposition and subjecting the reaction vapors to condensation by leading them under the surface of an extracting liquid whilst maintaining said extracting liquid at a temperature below the boiling point of water and whilst subjecting said extracting liquid to gentle stirring to maintain the temperature throughout the extracting liquid uniform and to ensure the contact of fresh extracting liquid with the reaction vapors.

9. In a process according to claim 1 the step of continuously feeding a supply of fresh extracting liquid into contact with the reaction vapors and continuously running off the extracting liquid laden with the dissolved anhydride.

10. In a process according to claim 1 the step of continuously removing from the extracting liquid the water separated thereby.

11. Process for the separation of vaporous mixtures comprising aliphatic anhydrides and water vapor which comprises passing said mixtures in a stream under the surface of an extracting liquid the temperature of which is maintained below the boiling point of water.

12. Process for the separation of a vaporous mixture comprising acetic anhydride and water vapor which comprises passing said mixture in a stream under the surface of an extracting liquid the temperature of which is maintained below the boiling point of water.

13. Process for the separation of vaporous mixtures comprising aliphatic anhydrides and water vapor which comprises passing said mixtures in a stream under the surface of a mixture of ether and petroleum ether the temperature of which mixture is maintained below the boiling point of water.

14. Process for the separation of a vaporous mixture comprising acetic anhydride and water vapor which comprises passing said mixture in a stream under the surface of a mixture of ether and petroleum ether the temperature of which mixture is maintained below the boiling point of water.

15. Process for the separation of a vaporous mixture comprising an aliphatic anhydride and water vapor which comprises passing said mixture in a stream under the surface of an extracting liquid maintained at a temperature between 15° and 25° C.

16. Process for the separation of a vaporous mixture comprising acetic anhydride and water vapor which comprises passing said mixture in a stream under the surface of an extracting liquid maintained at a temperature between 15° and 25° C.

17. Process for the separation of a vaporous mixture comprising acetic anhydride and water vapor which comprises passing said mixture in a stream under the surface of a mixture of ether and petroleum ether maintained at a temperature between 15° and 25° C.

18. Process for the separation of a vaporous mixture comprising an aliphatic anhydride and water vapor which comprises passing said mixture in a stream under the surface of an extracting liquid whilst maintaining said extracting liquid at a temperature below the boiling point of water and whilst subjecting said extracting liquid to gentle stirring to maintain the temperature throughout the extracting liquid uniform and to ensure the contact of fresh extracting liquid with the reaction vapors.

19. In a process according to claim 11 the step of continuously feeding a supply of fresh extracting liquid into contact with the reaction vapors and continuously running off the extracting liquid laden with the dissolved anhydride.

20. In a process according to claim 11, the step of continuously removing from the extracting liquid the water separated thereby.

HENRY DREYFUS.
CLIFFORD IVAN HANEY.